A. J. BECKER.
AUTOMOBILE LIFTING JACK AND TURN TABLE.
APPLICATION FILED NOV. 2, 1910.
990,096.
Patented Apr. 18, 1911.
3 SHEETS—SHEET 2.
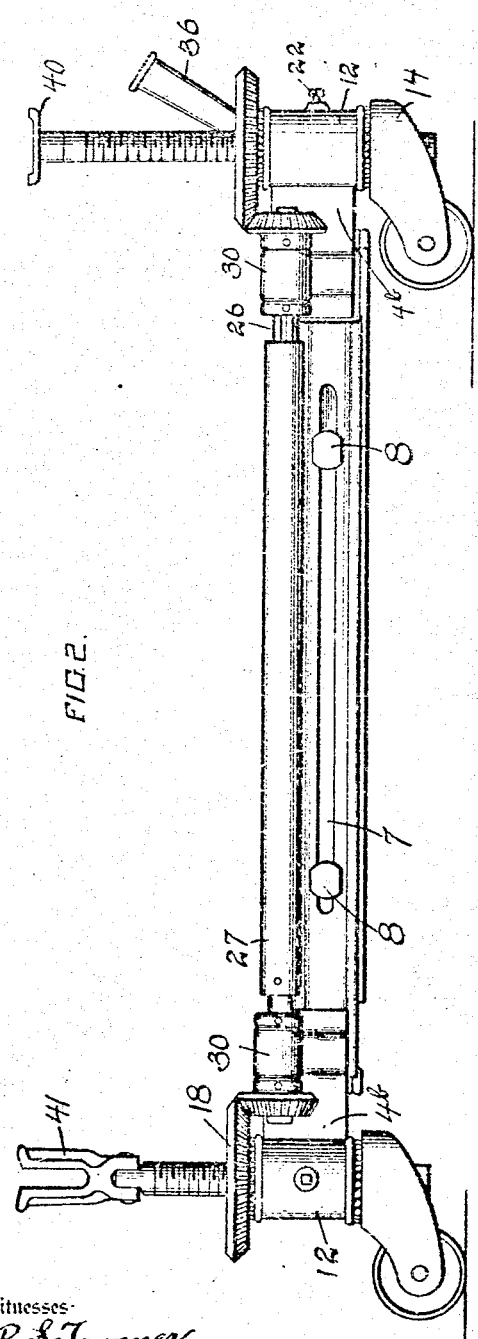
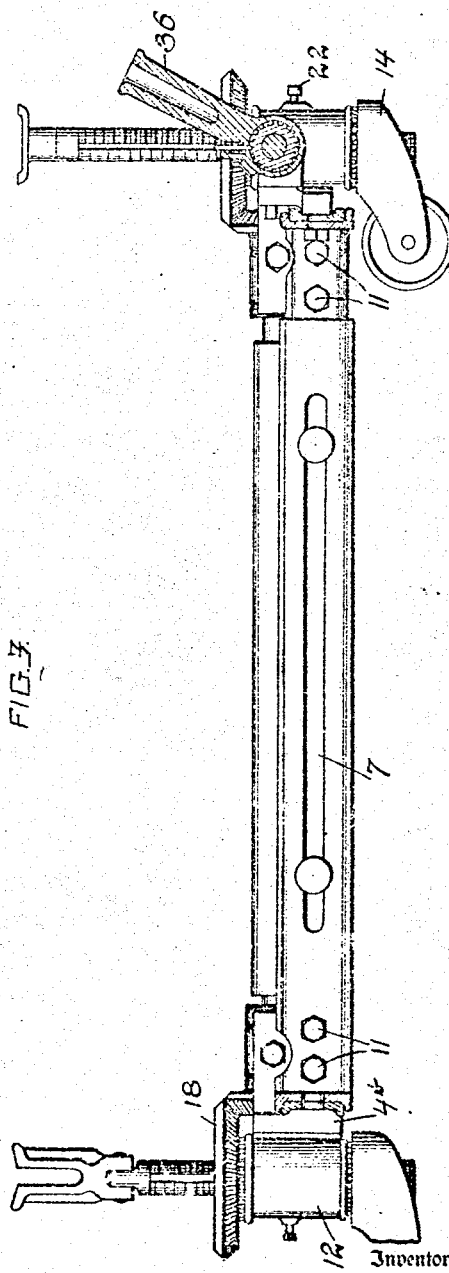
Witnesses
R. S. Trogner
A. N. Butler
Inventor
ALLEN J. BECKER.
By Eugene C. Brown
Attorney

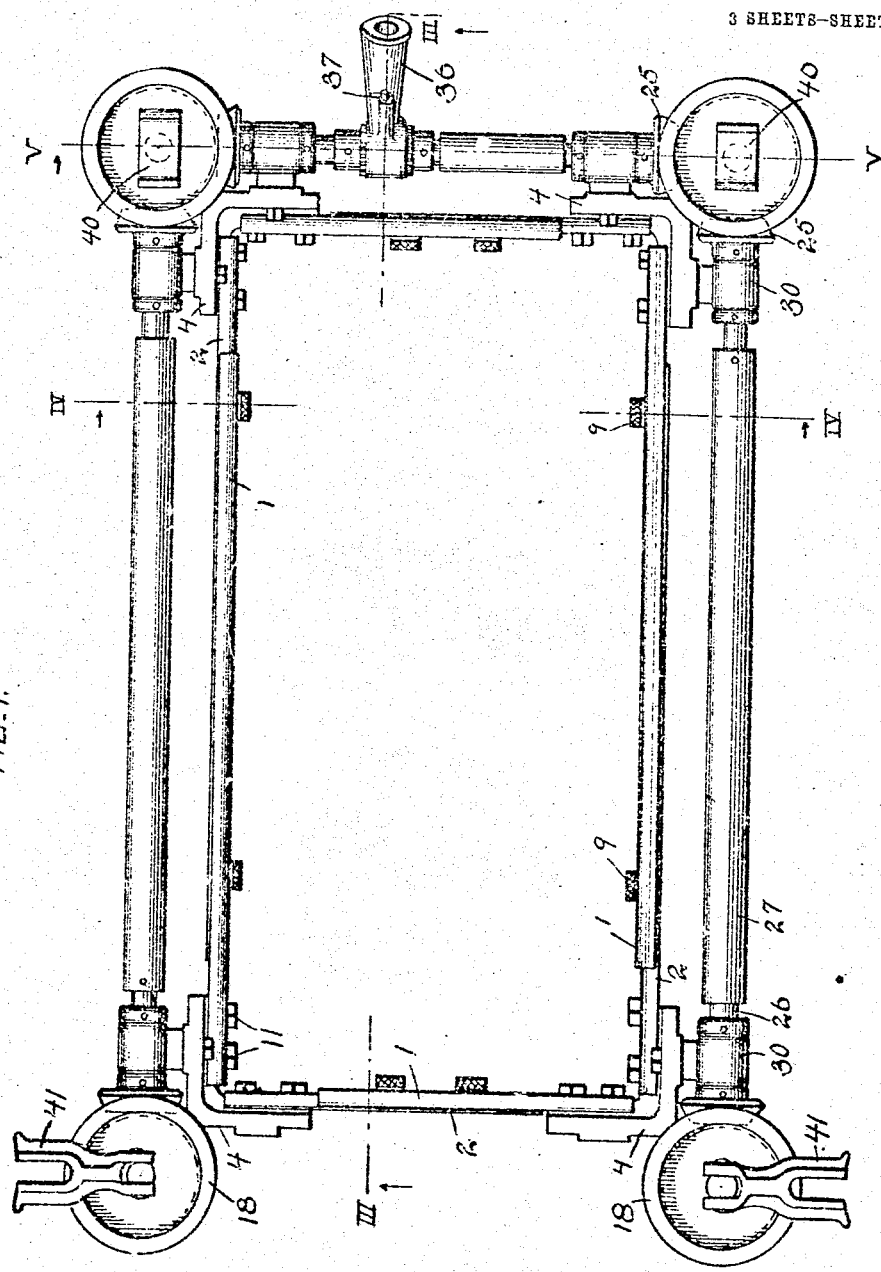

UNITED STATES PATENT OFFICE.

ALLEN J. BECKER, OF PITTSBURG, PENNSYLVANIA, ASSIGNOR TO THOMAS H. GRIFFIN, OF PITTSBURG, PENNSYLVANIA.

AUTOMOBILE LIFTING-JACK AND TURN-TABLE.

990,096.

Specification of Letters Patent. Patented Apr. 18, 1911.

Application filed November 2, 1910. Serial No. 590,321.

*To all whom it may concern:*

Be it known that I, ALLEN J. BECKER, a citizen of the United States, residing at Pittsburg, in the county of Allegheny and State of Pennsylvania, have invented new and useful Improvements in Automobile Lifting-Jacks and Turn-Tables, of which the following is a specification.

My invention relates to apparatus for lifting vehicles from the ground and supporting them in an elevated position while being moved about or for the purpose of making repairs.

The object of my invention is to provide a combined jack and truck or turntable for simultaneously lifting the front and rear axles of a vehicle and supporting the same upon the truck-platform, which may be turned in any direction and may be readily moved about with little effort by a single person. It is especially adapted to be used in lifting automobiles and moving them easily from one location to another in a garage or shop.

In this invention I have provided a skeleton table or platform which is adjustable both as to length and width to adapt it to different machines and yet being exceedingly rigid when the parts are locked in any adjusted position. The four supporting jacks at the corners of the frame are operated in multiple to simultaneously raise or lower the saddles which support the axles of a vehicle so that a machine may be readily handled by a single person. The saddles which support the rear axle are especially constructed to accommodate the truss-rods, and are pivotally mounted so that they may be folded over out of the way while the turntable is being pushed under the body of the vehicle.

The several objects of my invention will be apparent and the construction will be understood from the following description in connection with the accompanying drawings, in which—

Figure 4:
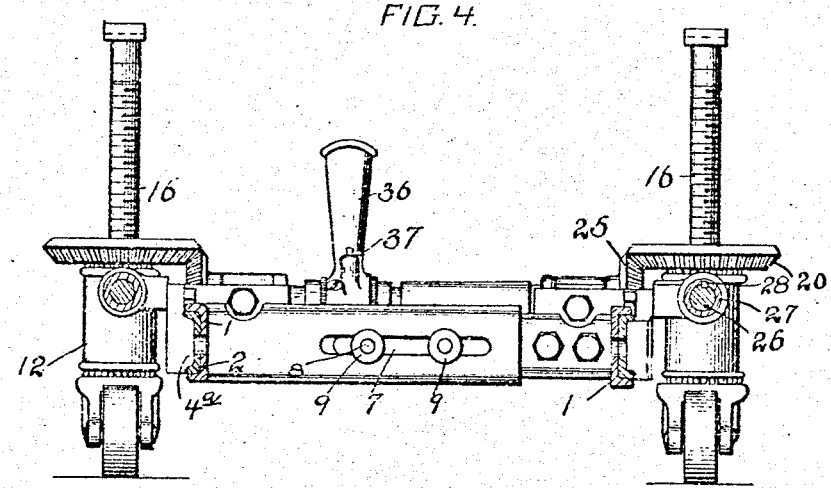
Figure 5:
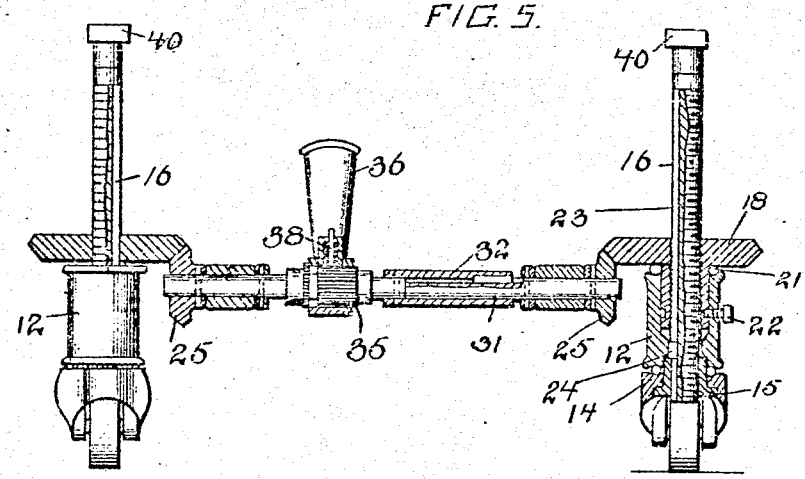

Figure 1 is a top plan view of a turntable truck embodying my invention; Fig. 2 is a side elevation; Fig. 3 is a vertical section on the line III—III of Fig. 1; Fig. 4 is an end elevation, partly in section, on the line IV—IV of Fig. 1; and Fig. 5 is a vertical section on the line V—V of Fig. 1.

The rectangular frame of my truck or turntable comprises duplex frame bars, each having inner and outer interfitting members 1, 2, adapted to slide upon one another and fastened respectively to corner brackets 4 at opposite ends. The inner bar is provided with a channel upon the outer side to receive the outer member, the upper and lower flanges of the channel forming a support for the inner bar. The bars are provided with longitudinal slots 7, to receive the shanks of locking bolts or screws 8, having squared heads which fit into the channels of the outer bar 2, and are threaded to receive the thumb-nuts 9. By loosening the thumb-nuts, the members of the frame-bars can slide telescopically upon each other, permitting the frame to be adjusted in size to adapt it to any vehicle, and when the nuts 9 are tightened the frame will be absolutely rigid. The interfitting channel bars of the frame prevent any sagging or vertical movement, and by arranging the channels on edge or vertically I have provided a structure which presents the maximum rigidity and strength. Furthermore, I provide the corner brackets 4 with lateral lugs $4^a$ which fit into the channels of the frame bars and very materially strengthen the frame and greatly add to the rigidity of the whole structure. By this construction the strain is largely taken from the bolts 11, by which the frame bars are secured to the arms of the corner brackets 4.

The corner brackets are provided with an integral arm $4^b$ which carries upon its outer end a tubular casing 12, which constitutes a part of the standard of the lifting jack. The lower end of the casing is provided with a ball-race 13, for the bearing of the caster 14, which is securely bolted to the casing by the lock-nut 15.

The lifting-screw 16 of each jack passes entirely through the casing 4 and engages the internal threads of the operating nut 18, which is provided with an annular flange having beveled teeth 20 constituting bevel gear for the purpose of driving the same as hereinafter described. This operating nut and gear is supported upon a ball bearing having a race 21 in the upper end of the casing 4. The lower portion of the nut projects within the casing and is secured by means of a screw 22 projecting within an annular groove. The lifting screw 15 is provided with a longitudinal slot 23, in which a key 24 is adapted to slide to prevent rotation of the screw.

For the purpose of simultaneously operating the four corner jacks, I provide bevel pinions 25, meshing with the teeth 20 of the gears 18, and connect the pinions upon each side by means of shafts which are extensible and move with the adjustments of the frame. Each shaft comprises an inner solid member or rod 26 having a longitudinal slot, and an outer tubular member 27 which is adapted to slide over the rod 26 but is prevented from rotating thereon by means of a tongue or key 28 fitting into the groove therein, the two members being thus constrained to rotate together. These shafts are supported in bearings 30, bolted to the corner brackets.

A drive shaft is provided at one end which is also extensible by means of inner and outer telescopic members 31, 32, provided respectively with slot and key. The ends of the drive shaft carry bevel pinions which engage the teeth of gears 18. The drive shaft is operated by means of a ratchet 35 and ratchet handle 36. In order that the shaft may be rotated in either direction, I attach a handle 37 to the projecting end of the spring ratchet pin 38, so that it may be turned with the beveled side of the ratchet pin in either direction.

The operation of my combined lifting-jack and turntable will be understood from the foregoing description.

The table is pushed under the automobile until the saddles 40 are under the front axle and the saddles 41 are under the rear axle. Inasmuch as the rear axles of automobiles are now usually provided with truss-rods extending across below the axle, the saddles would not pass under the rods if they were the same height as the front saddles, and moreover, as these truss-rods extend nearly to the ends of the axle, there is practically no room for the saddles to engage the axle. I therefore make the saddles for the rear axle yoke-shaped with a deep slot adapted to straddle the truss-rod and pivotally connect the saddle to the end of the lifting screw, so that it can be turned down upon one side until it has passed under the truss-rod. When the frame bars have been adjusted in length and width to properly conform to the vehicle axles, the jack-screws are simultaneously raised by operating the ratchet handle 36, until the vehicle is raised from the ground. The automobile may then be turned about in any direction or moved from one location to another with great ease on the ball-bearing casters. When it is desired to lower the vehicle, the ratchet pin is reversed by means of the handle 37 and the jack-screws will then be lowered by operating the ratchet handle 36. The rear saddles can be quickly folded inwardly upon their pivots and the turntable platform can then be moved from under the vehicle.

The advantages of my combined lifting-jack and turntable will be apparent to those who are familiar with the difficulties of lifting automobiles during repair and of turning them within a small radius in a garage or moving them from one location to another in a shop. The structure of my frame provides an exceedingly rigid platform and avoids the strains upon the securing bolts and screws. The folding yoke-saddles enable the turntable to be moved under low auto-trucks and reduce the amount of elevation of the jacks to a minimum. The arrangement of bevel-gears connecting the several jacks to a single ratchet device and the ball bearings interposed between the operating nuts and the corner piece casings coöperate to produce a mechanism which can be operated by a single person and enable him to manipulate the largest automobile with the greatest ease.

While I have described in detail the structure disclosed in the drawings for the purpose of illustrating one embodiment of my invention, it will be evident to engineers and those skilled in the art that many changes may be made therein without departing from the spirit of my invention, since

I claim:—

1. A combined multiple lifting-jack and turntable or rolling truck, comprising a rectangular frame having interfitting channel members slidable upon each other, means to lock the frame members rigidly in any adjusted position, corner brackets secured to and supporting said frame members and provided with offset tubular casings, jack screws provided with operating nuts rotatably mounted in said casings, extensible operating bars carrying bevel pinions geared to said nuts, said bars being in alinement with said casings, a ratchet device operatively connected to one of said bars, and casters secured to the lower ends of said casings.

2. A multiple lifting jack adapted to be operated from a common point, comprising an extensible rectangular frame, a jack secured to each corner of said frame, extensible means for operating said jacks in unison, and a bifurcated supporting saddle pivotally secured to the top of each of the jacks at one end of the frame.

3. A multiple lifting-jack adapted to be actuated by a single operating mechanism, comprising a plurality of single jacks provided with tubular casings, extensible bars operatively connected to said jacks and in alinement therewith, offset corner brackets connected to said casings within the inclosure of said bars, and extensible members connecting said brackets and forming a rectangular frame.

4. A multiple lifting-jack adapted to be operated from a common central point, comprising a plurality of single jacks, extensible frame members connecting said jacks, extensible operating bars supported by said frame members and operatively connected to said jacks and operatively connected together by means of gears, and a ratchet mechanism connected with one of said bars.

5. A multiple lifting-jack adapted to be operated from a common central point, comprising a plurality of single jacks, extensible frame members connecting said jacks, extensible operating bars supported by and in parallel relation to some of said extensible frame members and connected to said jacks and operatively connected together by means of gears, a ratchet mechanism connected with one of said bars, and means for reversing said ratchet mechanism.

6. A multiple lifting-jack adapted to be actuated by a single operating mechanism, comprising a plurality of single jacks provided with gears and with surrounding tubular casings, extensible bars in alinement with said jacks and carrying pinions meshing with said gears, corner brackets connected to said casings and offset within the inclosure of said bars, pairs of interfitting channel bars connecting said brackets, said channel bars having their webs in vertical planes, and ratchet mechanism secured to one of said extensible bars.

7. A multiple lifting-jack adapted to be operated from a common central point, comprising a plurality of single jacks' having tubular casings provided with offset angular corner brackets, extensible frame members secured to and connecting said brackets, a lifting-screw extending through each casing and provided with an operating nut supported upon the casing, independent means associated with said extensible frame members for operating said lifting screws, and a caster secured to the lower end of the casing, said casing having upper and lower ball races coöperating with said nut and said caster respectively.

8. A multiple lifting-jack adapted to be actuated by a single operating mechanism, comprising a plurality of single jacks provided with gears and with surrounding tubular casings, extensible bars in alinement with said jacks and carrying pinions meshing with said gears, corner brackets connected to said casings and offset within the inclosure of said bars, pairs of interfitting channel bars connecting said brackets, said channel bars having their webs in vertical planes, lugs projecting from said brackets within the channels of said bars, and ratchet mechanism secured to one of said extensible bars.

9. A vehicle lifting jack, comprising a rectangular caster-mounted frame-work, said frame-work comprising pairs of interfitting channel bars having their webs arranged in vertical planes, a bevel gear wheel mounted in bearings at each corner portion of the framework, and having an internal screw-thread, a vertical screw shaft passing through each bevel gear wheel and having means for preventing rotation, a load support on the upper end of each of said shafts, and means for simultaneously actuating the bevel gear wheels; substantially as described.

In testimony whereof I have hereunto set my hand in presence of two subscribing witnesses.

ALLEN J. BECKER.

Witnesses:
C. E. McCargo,
A. E. Anderson.